G. MOENCH.
Grain-Scourer.
No. 207,294. Patented Aug. 20, 1878.
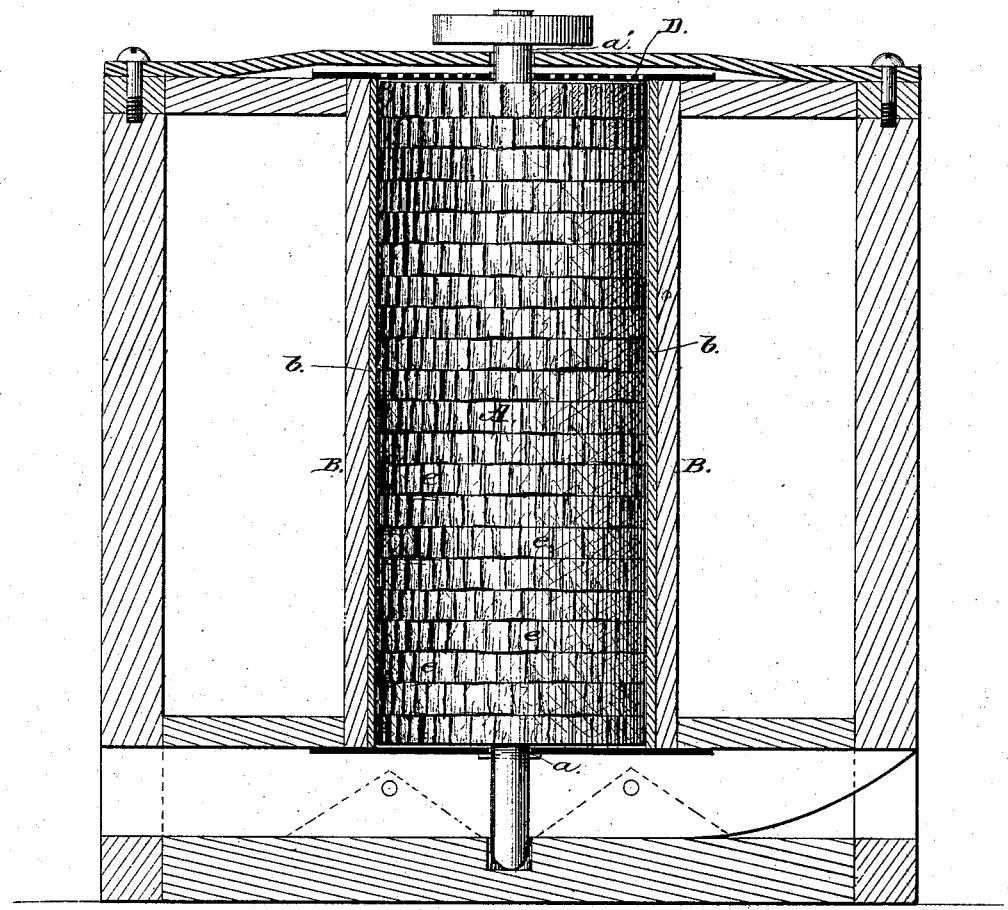
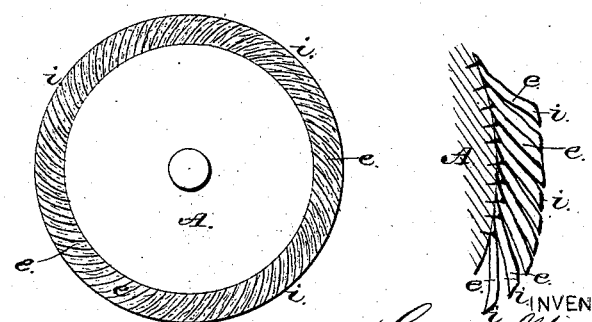
WITNESSES
INVENTOR
George Moench
ATTORNEY

UNITED STATES PATENT OFFICE.

GEORGE MOENCH, OF RUSHVILLE, ILLINOIS.

IMPROVEMENT IN GRAIN-SCOURERS.

Specification forming part of Letters Patent No. 207,294, dated August 20, 1878; application filed July 16, 1878.

*To all whom it may concern:*

Be it known that I, GEORGE MOENCH, of Rushville, in the county of Schuyler and State of Illinois, have invented a new and valuable Improvement in Grain-Scourers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a central vertical section of my improved scourer. Fig. 2 is a top view of the shingled drum, and Fig. 3 is a detail.

This invention has for its object to improve machines for scouring wheat and removing from the outer surface thereof hairy or fibrous substances adhering thereto.

The nature of the invention consists in a revolving drum shingled with leather strips overlying each other and inclined oppositely to the direction of rotation, in combination with a cylindrical casing plated on the inside with leather and snugly receiving the said shingled drum, whereby the grain, in passing down between the drum and casing, will be deprived of smut and other foreign and injurious substances, as will be hereinafter more fully set forth.

In the annexed drawings, the letter A designates a preferably wooden drum, arranged in an upright position in suitable bearings $a$ $a'$ in a casing, B, of somewhat larger diameter, and supported by a suitable frame.

The casing B may be made of wood in sections, and is lined inside with strips of sole-leather of about one inch in width, and extending the whole length of the said casing. These strips $b$ are laid with their flesh sides outward, and are secured to the casing in any suitable manner, covering its whole interior surface.

The drum A is also covered with leather of the description used in heavy harness in independent strips, arranged in rows and covering its entire periphery. These strips, indicated by the letter $e$, are secured to the drum in a position inclined oppositely to the direction of rotation of the said drum, and they overlie each other, as shown in Fig. 2, after the manner of shingles upon a rounded roof. The ends of the said strips are beveled off, as shown at $i$, the circular outline formed thereby being concentric with the periphery of the drum, to which they are secured.

The upper end of the casing is closed by a reticulated material, as wire-cloth, or by a perforated metallic plate, D, through which the impurities removed from the grain are expelled by a suitable blast.

The grain is fed to the scourer in an unmerchantable condition between the drum and case, and is subjected on its way down to a vigorous but elastic and yielding rubbing and polishing, which rids it of all foreign substances, which being retained would lower the grade of flour, and delivers it from the machine in a perfectly clean and smooth condition, suitable to producing a flour of high grade.

The leather plating of the casing and shingling of the drum being yielding or elastic and sufficiently rough, the grain in passing between them is never broken, but yet is invariably perfectly clean and polished.

I am aware that carpet-cleaners have been constructed with rawhide beaters secured to a revolving shaft.

I am also aware that grain-scourers have been employed having a series of leather beaters arranged radially around a drum. Hence I make no claim to such inventions.

What I claim as new, and desire to secure by Letters Patent, is—

1. In a grain-scourer, the rotary drum A, having its periphery shingled or wholly covered with inclined, overlying, or overlapping independent strips, substantially as specified.

2. The combination, in a grain-scourer, of the leather-lined casing B and the leather-shingled drum A rotating therein, substantially as specified.

In testimony that I claim the above I have hereunto subscribed my name in the presence of two witnesses.

GEORGE MOENCH.

Witnesses:
JOHN S. BAGBY,
CHARLES E. ROBINSON.